April 23, 1940.  R. P. McMAHON  2,198,257
FISHING REEL
Filed April 26, 1937  2 Sheets-Sheet 2
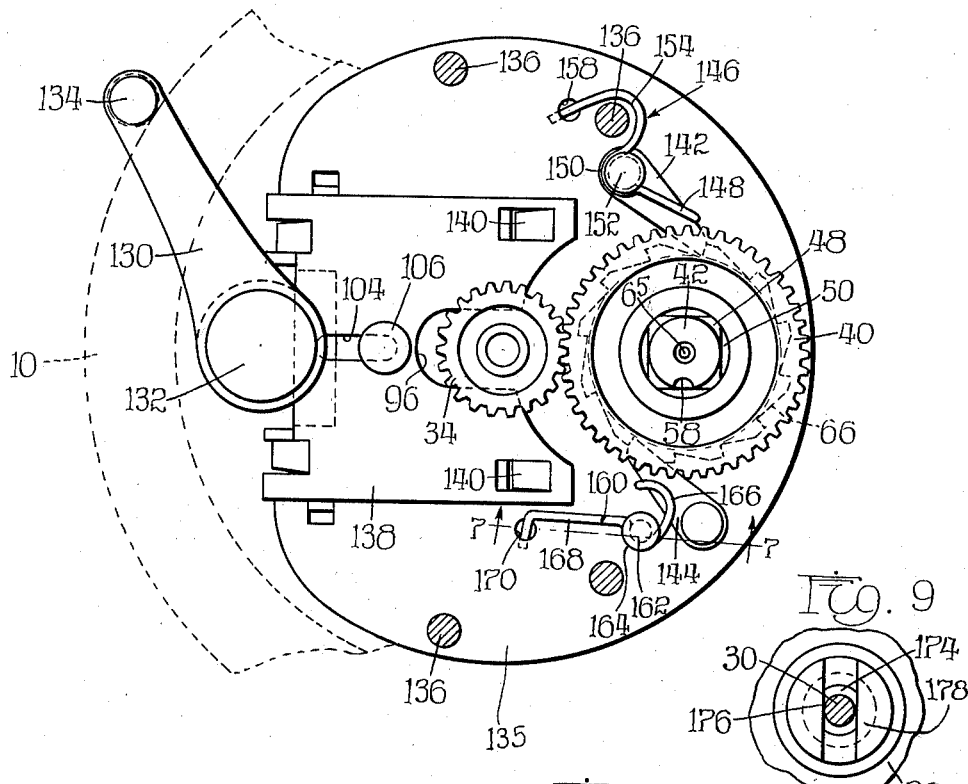
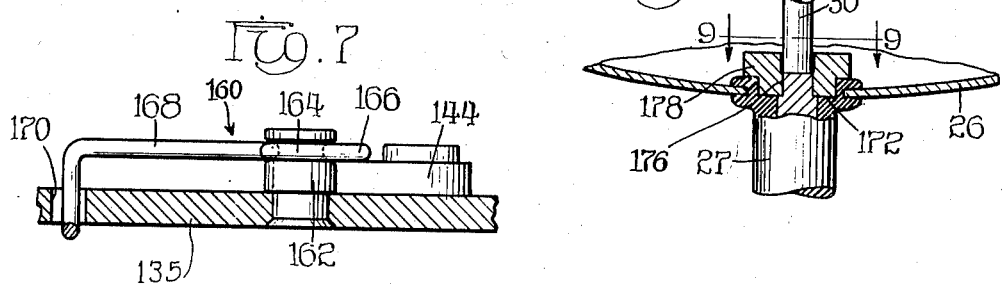
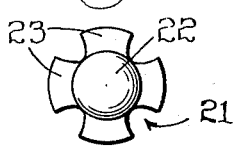
Inventor:
Richard P. McMahon
By Freeman, Sweet, Albrecht & Weidman
Attys.

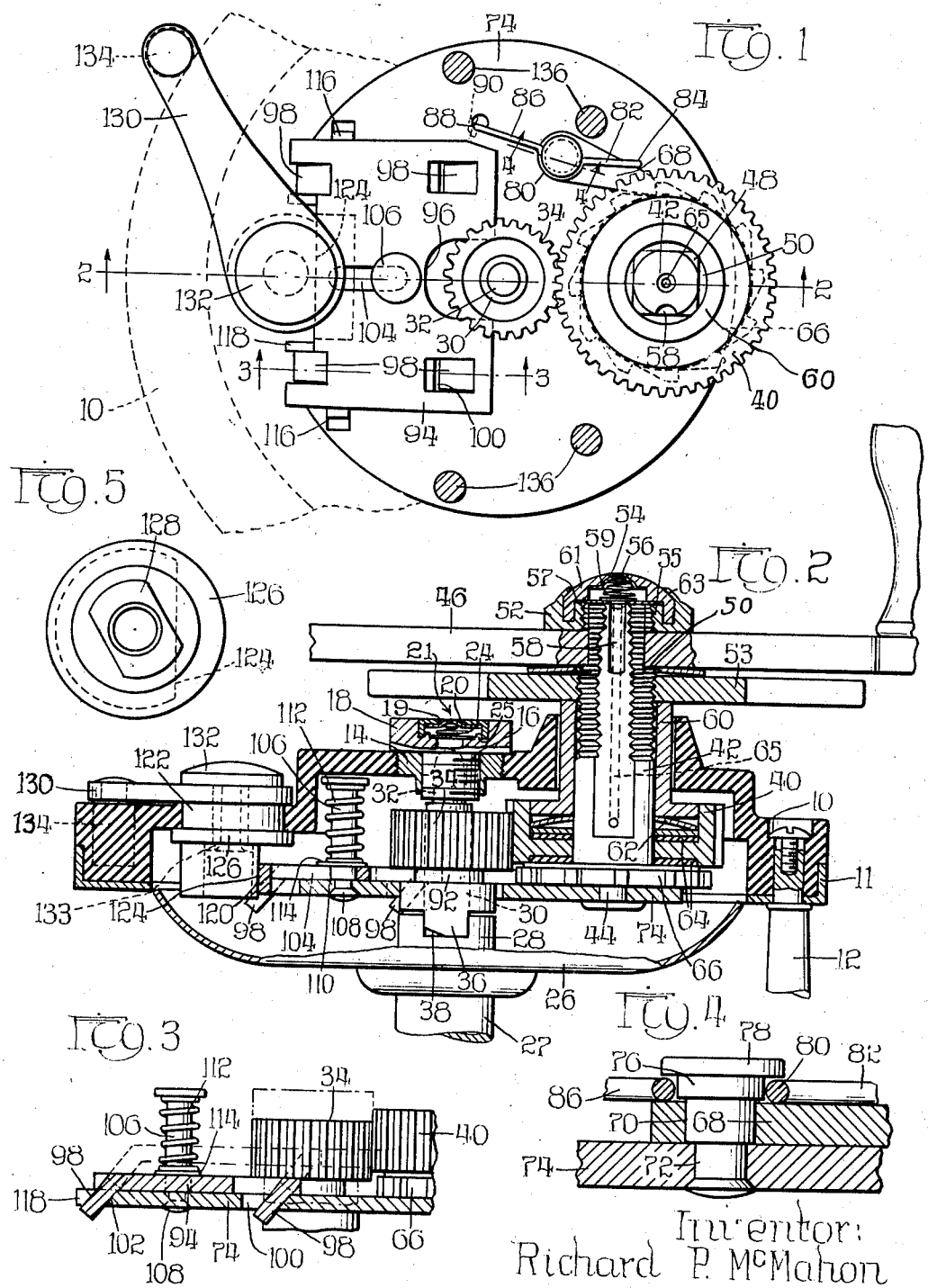

Patented Apr. 23, 1940

2,198,257

UNITED STATES PATENT OFFICE 2,198,257

FISHING REEL

Richard P. McMahon, Bronson, Mich., assignor to Bronson Reel Company, Bronson, Mich., a corporation of Michigan Application April 26, 1937, Serial No. 138,966

16 Claims. (Cl. 242—84.7)

My invention relates to fishing reels, and includes among its objects and advantages a simplified construction for reels of free spool type, accompanied by a reduction in friction when the spool is connected.

In the accompanying drawings:

Figure 1 is a plan view of the transmission assembly or chassis of a free spool reel:

Figure 2 is a section on line 2—2 of Figure 1;
Figure 3 is a section on line 3—3 of Figure 1;
Figure 4 is a section on line 4—4 of Figure 1;
Figure 5 is a plan view of the camshaft;
Figure 6 is a plan view similar to Figure 1 showing a heavy duty construction;
Figure 7 is a section on line 7—7 of Figure 6;
Figure 8 is a sectional detail of the clutch end of the spool;
Figure 9 is a section on line 9—9 of Figure 8; and
Figure 10 is a plan view of the oil seal proper.

In the embodiment of the invention selected for illustration in Figure 1, the reel comprises the usual frame with end plates, of which one is illustrated at 10, cross braced by pillars 12 into a rigid whole. The end plate illustrated is of Bakelite reinforced by a metal ring 11 and has a central aperture receiving a molded in bushing 14. Threaded in the bushing 14 is the bearing member for the spool pivot having the threaded shank portion 16 and a polygonal head 18. The head 18 is recessed to receive a cap 19 pressed into place to form a unitary and permanent assembly. The cap 19 has a central oil inlet hole 20 closed by the spring pressed plate 21. The plate 21 (see Figure 10) has a dome-shaped body 22 and four arms 23 forming substantially a Maltese cross. The spring 24 is a tapered helix with its small end next the plate 21. The head 18 has an inner flange 25 defining a socket for centering the spring 24 during assembly.

The spool comprises the usual rigid unitary structure including end bells 26 mounted on the axle assembly 27, which assembly includes a female clutch member formed at 28; a shaft portion 30; and a reduced pivot portion 32 supported in the end bearing.

In both positions of adjustment the pinion 34 is in mesh with the teeth of a drive gear 40. I have illustrated drive means for the gear 40, including the tubular drive shaft 42 pivoted on the stud 44. The crank 46 engages the squared end 48 of the shaft 42 and is clamped against the shoulder 50 by a retaining nut 52 provided with an oil inlet 54 and a spring pressed oil retaining plate 56. The plate 56 is similar in shape to the plate 21, but on account of the more exposed position of the nut 52, I employ a more rugged assembly. The inner flange 55 rises above the end of the shaft 42 and supports an annular plate 57 which affords a good abutment for the spring 59. Above this abutment the cap 61 is recessed to house the spring. And finally, the body of the nut includes a flange 63 spun in over the cap after the parts have been pressed together. In assembling, the cap 61 is laid upside down on a suitable support, the plate 56, spring 59 and abutment annulus 57 are nested in it in the order named, and the nut body is then forced home. Then the assembled parts can be transferred to a suitable chuck, for the operation of spinning over the flange 63.

A suitable oil channel 65 leads down to the parts to be lubricated.

One side of the squared portion 48 of the drive shaft 42 carries a groove 58 and the opening in the crank is square with a suitable projection entering the groove 58. The additional bearing surface thus obtained not only reduces the surface load between the parts, but assures that the crank will always be assembled in the same relative position with respect to the shaft, so that any microscopic variation from a square shape will not be cumulatively increased by successive assemblies in different relationships until the crank and shaft develop rotary looseness.

The star wheel 53 is threaded on the lower section of the shaft 42 and operates through the usual thrust sleeve 60 and spring washer 62 to compress the friction discs 64 against the web of the gear 40 and provide a friction connection for driving the gear.

Integral with the shaft 42 is the toothed ratchet wheel 66, which cooperates with the pivoted pawl 68 in preventing rotation of the shaft in the direction of paying out the line. Referring to Figures 1 and 4, the pawl 68 is located where it is above the ratchet 66 when the reel is in use, so that if the pawl spring should fail to function for any reason, the force of gravity will nevertheless be available to keep the parts in operative relationship.

The pawl 68 has a pivotal bearing at 70 on a supporting pin including the shank 72 riveted into the main supporting plate 74, the enlarged portion 76 defining a shoulder overlying the pawl with a slight clearance to insure free movement of the pawl, and the head 78 defining a shoulder overlying the central bight 80 of the pawl spring. The pawl spring includes the central bight 80, the front arm 82 turned down at 84 to engage the side of the pawl, and the rear arm 86 passing down through a hole in the plate 74 at 88 and having a laterally turned heel 90 to retain it in place. The relatively simple shape of the pawl spring facilitates replacement of a defective spring by a user who is not an expert mechanic. The hole 88 is large enough so that the spring can be inserted into it and then snapped into place, after which its slight initial tension in the position of Figure 1, retains it effectively. All the other parts of the transmission can be disassembled without causing the spring to become displaced.

The pinion 34 is shaped with a central groove 92 adapted to receive the cooperating edge portions of the shifting plate 94. The shifting plate has a U-shaped notch 96 defining the projections on either side of the notch which engage the groove 92 in the pinion.

The shifting plate 94 is of a generally rectangular shape and carries four inclined ears 98 near its corners. The chassis plate 74 is provided with apertures at 100 receiving the ears nearest the pinion and with edge portions at 102 for similar guiding engagement with the ears 98 farthest from the pinion. The ear-engaging surfaces of apertures 100 and edge portions 102 are beveled to secure surface contact with the faces of the cooperating ears.

The plate 94 is also slotted at 104. The stud 106 passes through the slot 104 and is fixedly mounted in the plate 74 as by a riveted end 108 and a shoulder 110. Between the head of the stud 106 and the clutch shifting plate 94 I provide a compression spring 112. To facilitate the sliding movement of the plate I interpose a washer 114 between the plate and the lower end of the compression spring.

The force of the compression spring 112 is imposed on the plate 94 in an approximately central position with respect to the four ears 98 so that the action of the spring and the ears provides complete guidance for the plate at all times. However, where extreme nicety in guiding the plate 94 is desired, I may provide vertical ears at 116 near the rear corners of the shifting plate 94 struck up out of the chassis plate 74. These ears, combined with the engagement between the slot 96 and the pinion, provide complete guidance for the movement of the plate in addition to the guidance of the ears 98. It will be obvious that the sides of the openings 100 may also engage the sides of the ears 98 to contribute to the guidance of the plate 94, and that the edge portions 102 may include projections at 118 for lateral guiding engagement with the rear ears 98.

Between the rear ears 98 the plate is provided with a plane rear bearing surface turned down at 120. Journaled in the end plate 10 is a pintle 122 that acts also as a cam or camshaft and includes: the flattened cam portion 124 lying in the plane of the rear bearing 120 of the plate 94; the annular shoulder 126; and the non-circular upper end portion 128 of reduced size. The actuating crank 130 is shaped to fit the non-circular portion 128 and held in place by the fastening 132 riveted into the central axial bore of the cam shaft as at 133. The crank 130 carries an actuating handle 134 at its outer end adapted to engage the edge of the head plate and limit the motion of the crank. However, in the position illustrated, the crank is held with the handle 134 not quite in contact with the head, by the engagement between the cam portion 124 and the rear face 120 of the shifting plate 94.

By rotating the crank 130 in a counterclockwise direction as viewed in Figure 1, the plate 94 may be slid to the right, and its accompanying upward movement will carry the gear 34 out of mesh with the female clutch member 28.

The chassis plate 74 constitutes a unitary assembly with the shaft 42, pinion 34, and plate 94, leaving only the camshaft 122 and bearing 16 to be independently supported by the head 10.

In the embodiment disclosed, the chassis plate 74 is connected to the pillars 12 through the Bakelite end plate 10, but it will be obvious that such a plate as 74 might be connected directly to the pillars 12. In such a frame, the element 10 becomes a mere protective cover, and the bearings for the spool end 34 and camshaft 122 may be supported from the chassis plate 74 or the cover plate 10. In either instance, the novel operation of the shifting plate 94 and associated parts remains unaffected. The surfaces of contact between the plate 94 and the pinion are plane, and remain in alignment throughout the movement; and the surfaces of contact between the shifting plate 94 and the chassis plate 74 are also plane and remain in alignment throughout the movement.

Referring now to the heavy duty embodiment of Figure 6, the chassis plate 135 differs from the chassis plate 74 primarily in that it is considerably larger. The pinion 34 is shifted by a plate 138 identical with the shifting plate 94 except that it extends far enough to the right to have its ears 140 engage the cooperative openings in the chassis plate 135 to the right of the plane of the axis of the pinion 34. Accordingly, any momentary thrust at the time of shifting would have no tendency to tilt the shifting plate. To reduce the impact load on the stud 44, I provide two pawls 142 and 144 engaging the ratchet 56 at substantially opposite points. The spring 146 for the pawl 142 has a pawl engaging arm 148 substantially identical with the arm 82 of Figure 1, and a bight 150 held in place by the pawl pivot 152 in the same way as in Figure 4. But the fulcrum arm 154 is curved out around the position for the fastening screw 136, and then socketed in the hole 158. The action on the pawl is identical with the action in Figure 1.

The spring 160 for the pawl 144 is provided with a separate supporting stud 162, which receives the bight 164 of the spring, as clearly shown in Figure 7, in the same way as in Figure 4. The pawl-engaging arm 166 is arcuate and extends around to the back of the pawl. The fulcrum arm 168 is straight and is socketed in the hole 170 close beside the plate 138. It will be apparent that the pawl spring of Figure 1 and the springs 146 and 160 all function identically so far as the pawl itself is concerned. Also, that each of them remains assembled on the chassis plate independent of the removal of the shaft 42 and transmission parts carried thereby, the spool and the pinion 34, or even the shifting plates 94 or 138, although these are preferably constructed so as not to be readily removed by the angler.

Referring now to Figures 8 and 9, to secure greater durability and shock resistance in the clutch parts, I have illustrated a construction in which the spool shaft 27 includes an annular socket 172, and in the plane of that socket the shaft 30 is enlarged as clearly indicated at 174, and flattened on opposite sides as at 176. The separate female clutch insert 178 may be made of special shock resisting metal and case hardened in cyanide, and is a press fit both against the outer wall of the socket 172 and against the surfaces 176 on the shaft 30. In this way the durability of the clutch teeth themselves may be increased many fold, without employing metal for the shaft 27 that would be difficult or impossible to machine.

Without further elaboration the foregoing will so fully explain my invention that others may, by applying knowledge current at the time of application, readily adapt the same for use under various conditions of service.

I claim:

1. In a fishing reel, in combination: an end plate; a spool journaled in said end plate; said spool having an end bell adjacent said end plate; a chassis plate fixedly mounted on said end plate and housed between said end plate and said end bell; and transmission carried by said chassis plate; said transmission including a drive gear; a crank; a friction drive between said crank and gear, including manual adjustment means for varying the friction; a drive pinion in constant mesh with said gear, said pinion being coaxial with said spool and axially slidable with respect to said spool; clutch means actuated by sliding said pinion to connect and disconnect said pinion and spool; a shifting plate; said shifting plate and chassis plate having spaced abutment means guiding said shifting plate in rectilinear movement at an acute angle to a plane normal to the spool axis; said shifting plate having portions adjacent said pinion; said pinion having abutment faces to engage said adjacent shifting plate portions; a single compression spring pushing said shifting plate against said abutment means and tending to move said shifting plate and pinion in the direction of operative engagement with said spool; an externally accessible lever; a pintle for said lever journaled in said end plate; said pintle extending through said end plate adjacent said shifting plate; said pintle having cam means engaging the edge of said shifting plate to move it in opposition to said spring; said cam means comprising a circular portion of radius sufficient to hold said spring compressed; and a single flat segmental portion of lesser radius adapted to permit said spring to expand sufficiently to clutch said spool, but not to release said cam and shifting plate, whereby said lever is held in a predetermined position by said spring when said spool is clutched; said lever having abutment means in the nature of a handle lying beside the edge of said end plate, for limiting the movement of said lever in the direction for unclutching; said plate having a widened edge portion providing a bearing surface for said cam.

2. In a fishing reel, in combination: a frame; a spool journaled in said frame; a transmission including a drive gear; a crank; a friction drive between said crank and gear, including manual adjustment means for varying the friction; a drive pinion in constant mesh with said gear, said pinion being coaxial with said spool and axially slidable with respect to said spool; clutch means actuated by sliding said pinion to connect and disconnect said pinion and spool; a shifting plate; abutment means guiding said shifting plate in rectilinear movement at an acute angle to a plane normal to the spool axis; said shifting plate having portions adjacent said pinion; said pinion having abutment faces to engage said adjacent shifting plate portions; a single compression spring pushing said shifting plate against said abutment means and tending to move said shifting plate and pinion in the direction of operative engagement with said spool; an externally accessible lever; a pintle for said lever journaled in said end plate; said pintle extending through said end plate adjacent said shifting plate; said pintle having cam means engaging the edge of said shifting plate to move it in opposition to said spring; said cam means comprising a portion of radius sufficient to hold said spring compressed; and a portion of lesser radius adapted to permit said spring to expand sufficiently to clutch said spool but not to release said cam and shifting plate, whereby said lever is held in a predetermined position by said spring when said spool is clutched; said lever having abutment means in the nature of a handle lying beside the edge of said end plate, for limiting the movement of said lever in the direction for unclutching.

3. In a fishing reel, in combination: a frame; a spool journaled in said frame; a transmission including a drive gear; a drive pinion in constant mesh with said gear, said pinion being coaxial with said spool and axially slidable with respect to said spool; clutch means actuated by sliding said pinion to connect and disconnect said pinion and spool; a shifting plate; abutment means guiding said shifting plate in rectilinear movement at an acute angle to a plane normal to the spool axis; said shifting plate having portions adjacent said pinion; said pinion having abutment faces to engage said adjacent shifting plate portions; resilient means pushing said shifting plate against said abutment means and tending to move said shifting plate and pinion in the direction of operative engagement with said spool; and externally accessible manual control means for actuating said shifting plate.

4. In a fishing reel, in combination: a frame; a spool journaled in said frame; a transmission including a drive gear; a crank for turning said gear; a drive pinion in constant mesh with said gear, said pinion being coaxial with said spool and axially slidable on said spool; clutch means actuated by sliding said pinion to connect and disconnect said pinion and spool; a shifting plate; abutment means guiding said shifting plate in rectilinear movement at an acute angle to a plane normal to the spool axis; said shifting plate having portions adjacent said pinion; said pinion having abutment faces to engage said adjacent shifting plate portions; resilient means pushing said shifting plate against said abutment means and tending to move said shifting plate and pinion in the direction of operative engagement with said spool; an externally accessible lever; a pintle for said lever journaled in said end plate; said pintle extending through said end plate adjacent said shifting plate; said pintle having cam means engaging the edge of said shifting plate to move it in opposition to said spring; said cam means comprising a portion of radius sufficient to hold said spring compressed; and a portion of lesser radius adapted to permit said spring to expand sufficiently to clutch said spool but not to release said cam and shifting plate, whereby said lever is held in a predetermined position by said spring when said spool is clutched.

5. In a fishing reel, in combination: a frame; a spool journaled in said frame; a transmission including a drive gear; a crank for turning said gear; a drive pinion driven by said gear; movable clutch means for connecting and disconnecting said pinion and spool; a shifting plate; abutment means guiding said shifting plate in rectilinear movement at an acute angle to the direction of movement of said clutch means; said shifting plate having portions adjacent said clutch means; said clutch means having abutment faces to engage said adjacent shifting plate portions; resilient means pushing said shifting plate against said abutment means and tending to move said shifting plate and clutch means in the direction of operative engagement with said spool; an externally accessible lever; and cam means actuated by said lever and engaging said shifting plate to move it in opposition to said spring.

6. In a fishing reel, in combination: a frame; a spool journaled in said frame; a transmission including a drive pinion; movable clutch means for connecting and disconnecting said pinion and spool; a shifting element; abutment means guiding said shifting element in rectilinear movement at an acute angle to the direction of movement of said clutch means; said shifting element having portions adjacent said clutch means; said clutch means having abutment faces to engage said adjacent shifting element portions; and externally accessible manual control means for actuating said shifting element.

7. In a fishing reel, in combination: a frame; a spool journaled in said frame; a drive pinion; clutch means actuated by sliding axially of said spool to connect and disconnect said pinion and spool; a shifting plate; abutment means guiding said shifting plate in rectilinear movement at an acute angle to a plane normal to the spool axis; said shifting plate having portions adjacent said clutch means; said clutch means having abutment faces to engage said adjacent shifting plate portions; and externally accessible means for actuating said shifting plate.

8. In a fishing reel, in combination: a frame; a spool journaled in said frame; a drive pinion; clutch means actuated by sliding axially of said spool to connect and disconnect said pinion and spool; a shifting plate; means guiding said shifting plate in rectilinear movement at an acute angle to a plane normal to the spool axis; said shifting plate having portions adjacent said clutch means; said clutch means having abutment faces to engage said adjacent shifting plate portions; and externally accessible means for actuating said shifting plate.

9. In a fishing reel, in combination: a frame; a spool journaled in said frame; a drive pinion; clutch means actuated by sliding axially of said spool to connect and disconnect said pinion and spool; a shifting plate; means guiding said shifting plate in rectilinear movement at an acute angle to a plane normal to the spool axis; said shifting plate having portions adjacent said clutch means; said clutch means having abutment faces to engage said adjacent shifting plate portions; externally accessible means for actuating said shifting plate to disconnect said pinion and spool; and resilient means housed in said frame and tending to connect said pinion and spool.

10. In a fishing reel, in combination: a frame; a spool journaled in said frame; a drive pinion; clutch means integral with said pinion and actuated by sliding axially on said spool to connect and disconnect said pinion and spool; a shifting plate; means guiding said shifting plate in rectilinear movement at an acute angle to a plane normal to the spool axis; said shifting plate having portions adjacent said clutch means; said clutch means having abutment faces to engage said adjacent shifting plate portions; and externally accessible means for actuating said shifting plate.

11. In a fishing reel of the type comprising a frame; a rotatable spool; a transmission for driving said spool; and a ratchet-pawl for preventing retrograde motion of part of said transmission: a pawl-retaining spring comprising an open central U-shaped bight, arms projecting from the ends of said bight in generally opposite directions, a lateral projection at the end of one arm to engage the side of said pawl, and a laterally extending hook portion at the end of the other arm; said frame including a member having a hook-receiving aperture, and a pivot for said pawl having a shouldered projection to enter said bight and retain said spring against axial removal; said apertured member and pivot being constructed, positioned and arranged to permit said spring to be assembled by entering said hook in said aperture, turning the spring to engage said projection with the side of said pawl and snapping said bight over said pivot.

12. In a fishing reel, in combination: a frame; a rotatable spool; a drive member rotatable about said spool axis and axially movable; cooperating clutch members shaped and positioned to be moved into and out of clutching engagement with each other by axial movement of said drive member; upwardly facing and downwardly facing plane abutment faces on said drive member; a shifting element having downwardly facing and upwardly facing plane abutment faces engaging said upwardly facing and downwardly facing drive member faces, respectively; guide means comprising plane abutment faces on said shifting member and frame, for guiding said member in rectilinear movement at an oblique angle to said drive member faces; resilient means acting on said shifting element and tending to move the clutch members into engagement; and externally accessible manual means for actuating said shifting element in opposition to said spring, to disengage said clutch members.

13. In a fishing reel, in combination: a frame; a rotatable spool; a transmission including cooperating clutch members shaped and positioned to be moved into and out of clutching engagement with each other by axial movement; and a shifting element having a plane clutch actuating face engaging a clutch member, and a plane frame abutment face means at an angle to said clutch actuating face, whereby said shifting element is guided in rectilinear movement at an angle to its clutch actuating face; one of said clutch members having a face receiving the force of said clutch actuating face; said receiving face being also plane; and means for actuating said shifting element; said frame abutment face means being in multiple with contact at not less than three spaced points defining a predetermined plane; and said actuating means including a spring pressing said abutment face means into operative guiding engagement, and pressing said shifting element toward the position for engaging said clutch members.

14. In a fishing reel, in combination: a frame; a rotatable spool; a transmission including cooperating clutch members shaped and positioned to be moved into and out of clutching engagement with each other by axial movement; and a shifting element having a plane clutch actuating face engaging a clutch member, and a plane frame abutment face means at an angle to said clutch actuating face, whereby said shifting element is guided in rectilinear movement at an angle to its clutch actuating face; one of said clutch members having a face receiving the force of said clutch actuating face; said receiving face being also plane; and means for actuating said shifting element; said frame abutment face means being in multiple with contact at not less than three spaced points defining a predetermined plane; and said actuating means including a spring pressing said abutment face means into operative guiding engagement, and pressing said shifting element toward the position for engaging said clutch members; said abutment face means having operative abutment in one direction only in opposition to the force of said spring; said spring acting on said shifting element at a point enclosed within a polygon defined by the lines joining said spaced contact points, whereby said spring force is effective to prevent tilting of said shifting element.

15. In a fishing reel of the type comprising a frame; a spool journaled in said frame; a transmission for driving said spool including a spring biased clutch actuating member; and externally accessible manual means for moving said member against the action of its spring; said manual means including a rotary cam member having a flat portion receiving the spring force when the spring is expanded, and a portion of constant radius receiving the spring force when said spring is compressed; said flat portion and said portion of constant radius together making up the entirety of the operative contact surface of said cam; said manual means including an operating crank lever connected and arranged to have its handle portion closely adjacent the reel frame when said clutch is connected.

16. A structure according to claim 15, in which the externally accessible manual means, when the clutch is connected, is at its limit of motion in the direction in which it would be urged by accidental contact with the user's hand when reeling in line.

RICHARD P. McMAHON.